United States Patent [19]
Bakke et al.

[11] Patent Number: 6,016,498
[45] Date of Patent: Jan. 18, 2000

[54] OBJECT ORIENTED ARCHITECTURE WITH BIDIRECTIONAL LINKING OF RELATIONSHIPS BETWEEN OBJECTS

[76] Inventors: Stephen Peter Bakke, 5353 Keller Springs Rd., Apt. 311, Dallas, Tex. 75248; William R. Lovin, P.O. Box 307, Allen, Tex. 75002; Patrick E. Dobyns, 1726 Parkhurst, Garland, Tex. 75040; John Martindale, 5819 Bent Creek Trail, Dallas, Tex. 75252

[21] Appl. No.: 09/123,573

[22] Filed: Jul. 28, 1998

Related U.S. Application Data

[63] Continuation of application No. 08/610,693, Mar. 4, 1996, Pat. No. 5,787,440.

[51] Int. Cl.[7] .................................................. G06F 17/30
[52] U.S. Cl. ............................. 707/103; 707/1; 707/100
[58] Field of Search ............................. 707/5, 201, 103, 707/1, 100

[56] References Cited

U.S. PATENT DOCUMENTS

| | | | |
|---|---|---|---|
| 4,763,317 | 8/1988 | Lehman et al. | 370/358 |
| 5,181,162 | 1/1993 | Smith et al. | 707/530 |
| 5,195,172 | 3/1993 | Elad et al. | 706/62 |
| 5,202,981 | 4/1993 | Shackelford | 707/1 |
| 5,278,954 | 1/1994 | Hohlfeld et al. | 345/507 |
| 5,291,593 | 3/1994 | Abraham et al. | 707/103 |
| 5,295,222 | 3/1994 | Wadhwa et al. | 395/703 |
| 5,297,249 | 3/1994 | Bernstein et al. | 345/356 |
| 5,303,379 | 4/1994 | Khoyi et al. | 395/710 |
| 5,315,703 | 5/1994 | Matheny et al. | 345/507 |
| 5,410,326 | 4/1995 | Goldstein | 348/734 |
| 5,421,008 | 5/1995 | Banning et al. | 707/4 |
| 5,444,849 | 8/1995 | Farrand et al. | 709/237 |
| 5,471,619 | 11/1995 | Messina | 707/8 |
| 5,493,682 | 2/1996 | Tyra et al. | 395/703 |
| 5,551,027 | 8/1996 | Choy et al. | 707/201 |
| 5,729,738 | 3/1998 | Watanabe et al. | 707/103 |
| 5,754,843 | 5/1998 | Imanaka et al. | 707/5 |

*Primary Examiner*—Paul V. Kulik
*Assistant Examiner*—Cheryl Lewis
*Attorney, Agent, or Firm*—Gregory M. Howison

[57] ABSTRACT

An object oriented architecture is provided wherein a plurality of objects are defined in the system. Each of the objects can comprise either a data oriented object, a program oriented object or a graphics oriented object. The parameters of the object are defined in an object table which includes as an integral part thereof a link table. Each object is linkable through the link table to other objects on the system, with each object on the system having a unique object number. The provision of the object's number in the link table defines relationships with other objects in the system, which relationships can either be automatically created as a result of a predetermined functional aspect of the system or defined by the user. These relationships are bidirectional. The links are only a single link deep and are all on the same plane. These links allow system access to various features such as word processing files, FAX information, information about individuals or information about E-Mail. Additionally, the system allows the underlying program to a given object that created an object to be launched directly from the object window, such that the program is always linked to the object.

3 Claims, 8 Drawing Sheets

OBJECT ORIENTED ARCHITECTURE WITH BIDIRECTIONAL LINKING OF RELATIONSHIPS BETWEEN OBJECTS

This application is a continuation of application Ser. No. 08/610,693, filed Mar. 4, 1996, U.S. Pat. No. 5,787,440.

TECHNICAL FIELD OF THE INVENTION

The present invention pertains in general to object oriented architectures, and more particularly, to a planar object oriented architecture with bidirectional linking of the objects.

BACKGROUND OF THE INVENTION

As software applications have matured, the software industry has seen a progression from individual standalone software packages to integrated packages. However, even the standalone packages have been forced to adapt to use with other software packages. This has required the software vendors to insure that their packages worked "seamlessly" with other packages. In this seamless operation, it is necessary that one software package be able to import files, spreadsheets, etc. from other software packages. For example, word processing packages initially only accepted files in their format. However, the software vendors soon realized that, in order to allow interface between files created on different computers and with different packages, it was necessary to allow files created with different word processing packages to be "imported" into their word processing package. As the word processing packages have developed over the years, they have expanded into desktop publishing packages requiring the ability to handle raphics, spreadsheets, etc. This again caused the software vendors to insure that they could import different graphics formats and different spreadsheet formats into their unique format. This, of course, required that the operation be done "transparent" to the user, such that when the user viewed either the graphics or the spreadsheet on one software package, it appeared the same on another software package.

In order to handle the transfer of information between the various applications, the concept of an "object" arose. Objects essentially comprise the component p arts of applications and documents. Each of these component parts is defined as a separate object, which object has associated therewith various parameters that define the environment. Once defined, these objects can be encapsulated within a program or can be some how attached or embedded in a given database or program. One of the better known standards for integrating applications with object technology has been introduced by Microsoft Corporation as its OLE standard. The goal of OLE is to allow users to place information created by one application inside a document created by another in such a way that the information can always be edited in the originating application. This allows one to place a spreadsheet data object in a word processing document wherein it would appear in the word processing document. However, in order to edit the spreadsheet, this would require the spreadsheet program to be "launched" out of the word processing document. However, the program would then switch over to the spreadsheet program to allow the editing. Once edited, the system would return to the original word processing document. One disadvantage that present systems have is that they have difficulty in keeping track of the various objects. Typically, the organization structure is a hierarchical structure, wherein a link between two objects is defined in one program and then allows the user to link back to another program and so on. Typically, there is only a single link between the application in which the object is either contained or embedded and the application associated with that object. Other relational aspects between objects are typically not provided for.

SUMMARY OF THE INVENTION

The present invention disclosed and claimed herein comprises a method for linking objects in an object-oriented system. A database is first provided with select portions thereof associated with objects. The objects are created which define the characteristics of the predetermined portions of the database. Links are then created between select ones of the objects in accordance with predetermined criteria. The links indicate a relationship between the linked objects. The created links are then stored in association with each of the associated objects to define the links from each of the objects to other of the objects. A select one of the objects is then accessed and defined as the primary object. The step of accessing also accesses the stored links associated with the primary object. A select one of the links associated with the primary object is then selected. The step of selecting the one link results in the object associated with that link other than the primary object being selected and defined as being a new primary object. The associated links for the new primary object define a link to the previous primary object.

In another aspect of the present invention, each of the objects created in the system has a unique object number defined or associated therewith. This unique object number is defined upon the creation of the object. A table is provided for each of the objects that contains the characteristics of that object in addition to the unique object number. Additionally, all of the links are contained in the table associated with each of the objects, these links defined merely as the object numbers of each of the linked-to objects.

In yet another aspect of the present invention, each of the links defines a link between only two objects, a primary object and a linked-to-object. There are two types of links that are created, user created links and automatically created links. The user created links are created in response to a user selection operation wherein the user defines one of the other objects to be related to the primary object and this information is then stored in the associated table and in the table associated with the linked-to object. An automatically created object is created upon the occurrence of a predetermined event. Upon the occurrence of this predetermined event, a relationship is defined and the object that is the subject of the relationship is then linked to the primary object.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
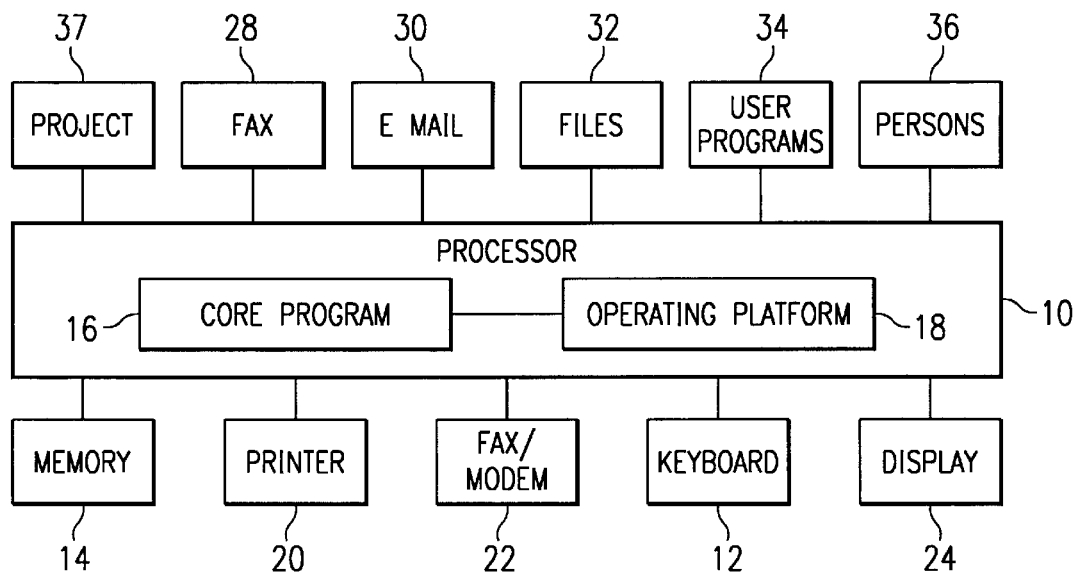
FIG. 1a illustrates an overall block diagram of the system of the present invention.

Referring now to FIG. 1, there is illustrated the object oriented system of the present invention run in a general processor-based computer 10, which can be any type of conventional personal computer (PC). The PC 10 has associated therewith the necessary hardware to execute various instructions associated with applications programs. These typically require some type of microprocessor, the circuitry required to run a microprocessor, memory, both Random Access Memory and Mass Storage Memory in the form of hard disks, and input/output structure. The PC 10 is operable to receive instructions external to the processor from a peripheral device such as a keyboard 12 to load a program from an external memory device 14 into operating memory (not shown).

The system of the present invention is basically comprised of a core program 16 which operates on an operating platform 18. In the present embodiment, the operating platform is a Windows™ platform that in general provides for control of the majority of the input/output functions necessary to interface the present application with other applications, with input/output devices, etc. This is a conventional widely used operating platform. The operating platform 18 is operable to interface with an external printer 20, a FAX/modem device 22, a keyboard 12 and a display 24. Again, this operation is conventional.

The core program 16 is a program that operates over the operating platform 18 and requires the operating platform 18 in order to operate. The core program 16 has various "objects" associated therewith, these being designated as a FAX object 28, an E-Mail object 30, a file object 32, user program objects 34 and Person objects 36 and Project objects. These will be described in more detail hereinbelow. However, it should be understood that various other objects can be utilized. Each of these objects has associated with it various parameters. For example, each Person object has associated various parameters such as the name of the person, the address of the person, title of the person, phone number of the person and other unique information about that person. Additionally, as will be described in more detail hereinbelow, the Person object has a unique object number on the system. In association with this Person object is a link table which defines its relationship within the system to all other objects within the system. These links are for the most part user defined, but can be automatically defined by the system, as will be described in more detail hereinbelow.

Figure 2:
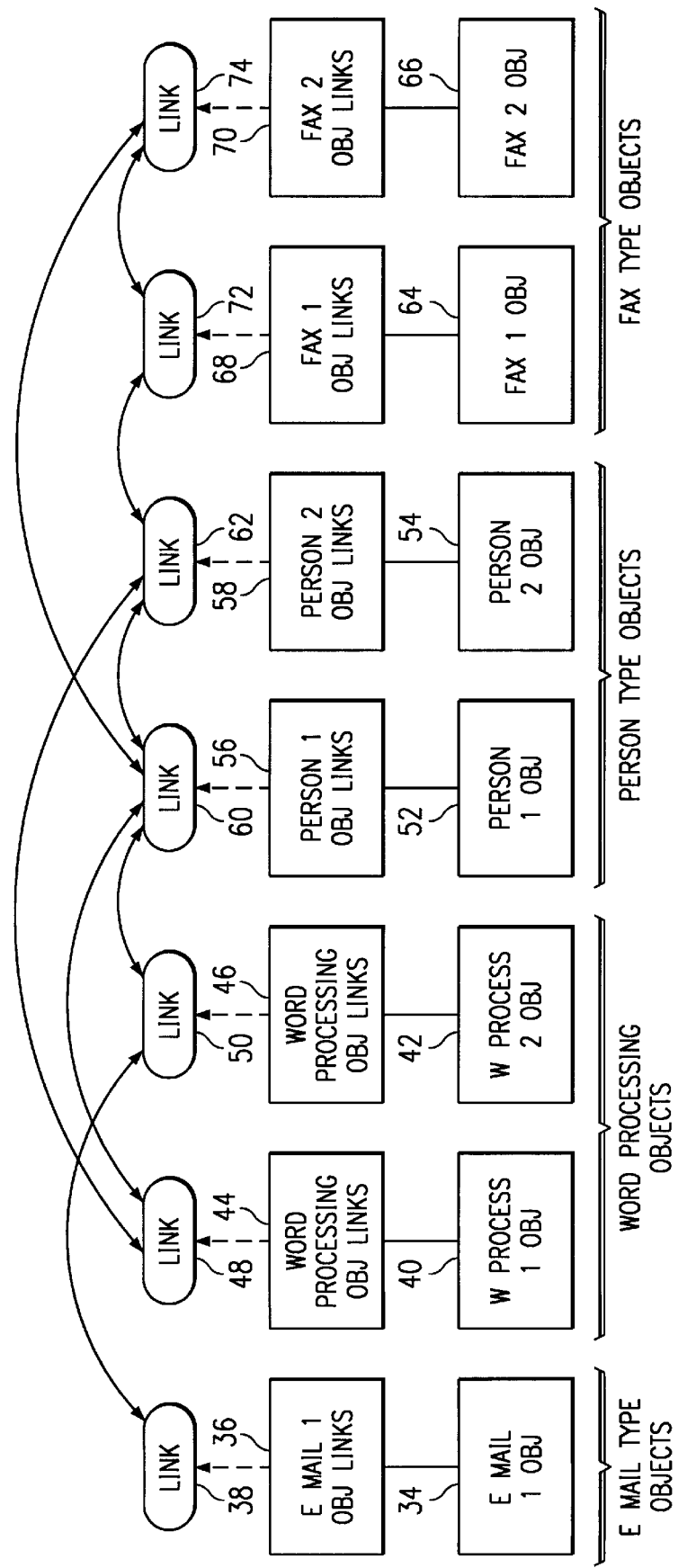
FIG. 2 illustrates a detailed diagrammatic view of the object linking of the present invention.

Referring now to FIG. 2, there is illustrated a diagrammatic view of the relationship between objects. In FIG. 2, there are illustrated various objects. An E-Mail object 34 is illustrated which has associated therewith an object link table 36. This object link table 36 defines the relationship of the E-Mail object 34 with various other objects, including other E-Mail objects. This is illustrated as a link 38, which will be described hereinbelow. Additionally, there are illustrated two Word Processing objects 40 and 42, associated with two completely different Word Processing objects. The Word Processing object 40 has associated therewith an object link table 44, and the Word Processing object 42 has associated therewith an object link table 46. The object link table 44 has associated therewith a link 48 and the object link table 46 has associated therewith the object link table 50. Person objects are illustrated, Person object 52 and Person object 54, having object link tables 56 and 58, respectively, associated therewith. Each of the object link tables 56 and 58 has respective links 60 and 62 defined therein. There are two FAX objects 64 and 66 illustrated having object link tables 68 and 70, respectively, associated therewith. These have respective links 72 and 74 associated therewith.

The Word Processing objects are essentially some type of word processing file that was already created and stored when in a word processing program. The Person object, as defined above, is typically associated with the parameters about that person. The FAX object essentially comprises a facsimile that was either transmitted or received, which facsimile would have associated therewith various parameters about that facsimile such as when it was received or sent, the baud rate that it was received with or sent with, the phone number from which the FAX was sent, the textual or graphic data, and possibly the program that was utilized to send the FAX or receive the FAX. Similarly, the E-Mail object would merely be data associated with an E-Mail message having associated therewith the various parameters about the message, such as when it was received, the description, its priority, its date of reception/transmission, etc. Each of these, of course, is conventional. The relational links provided between the various objects are defined in the object link tables. For example, the diagram of FIG. 2 illustrates a bidirectional link between E-Mail object 34 and the Word Processing object 42. As such, when the user views the E-Mail object 34, it will illustrate the various links, one of which will be to the Word Processing object 42. With this link, the individual can quickly go to the Word Processing object 42, which will also illustrate a link back to E-Mail object 34. Similarly, the Word Processing object 42 is also linked to the Person object 52 through the links 50 and 60. The Person object 52 is linked to multiple objects such as the Word Processing object 40, the FAX object 66 and the Person object 54 through the links 48, 74 and 62.

In order to traverse through the various relationships, the user merely needs to select an object and then examine its relationships to the objects. Typically, the objects are grouped such that a group of, for example, Word Processing objects can be viewed as a list of objects displayed by title. The desired Word Processing object can then be selected from this group. Once selected, the user can then view the various relationships or "links" with other objects. For example, if the Word Processing object 40 were selected from the group, this would illustrate a link to both the Person object 52 through links 48 and 60 and also to the Person object 54 through the links 48 and 62. If the user desired to select the Person object 54, this would select links 48 and 62 and then the Person object 54 would be selected. The user could then view the relationship to the Person object 54 and see that it had relationships or user created links to the Person object 52, the Word Processing object 40 and also to the FAX object 64. It should be noted that the link back to the Word Processing object 40 is still illustrated, this being a bidirectional link. If the user now desired to view the FAX object 64, he would then select that link and open the FAX object 64 through the links 62 and 72. However, once the user has selected the FAX object 64, there is no link provided back to the Word Processing object 40, since there is no relationship of the FAX object 64 to the Word Processing object 40. If the user felt that there should be a link, this link must be placed in the object link table 68 associated with the fax object 64. Therefore, the linking structure is only a single link deep, and as such, has relatively no hierarchical structure. This therefore allows a user to create the various relationships that are necessary in the system with all objects having equal status in the system. For example, if a user created a FAX document, he or she might want to link this FAX document to the individual that it was sent to, link it to an individual that it was about, and possibly link it to another related word processing document, which word processing document would comprise a Word Processing object in the system. To create this link, it would only be necessary to "find" the object in the system and then create the links. This, of course, is relatively easy since most of the links that are being created will be relatively fresh in the user's mind. At a later time, when the user is trying to reconstruct some sequence of events, it is only necessary to remember the title of the word processing document, the title of the FAX, the person to which the FAX was sent, or other persons related to the FAX in order to determine something about that transaction. Once one of the links has been discovered, the other links can be discovered., This, therefore, significantly improves the ability of the user to relate objects within an object oriented application.

Figure 3:
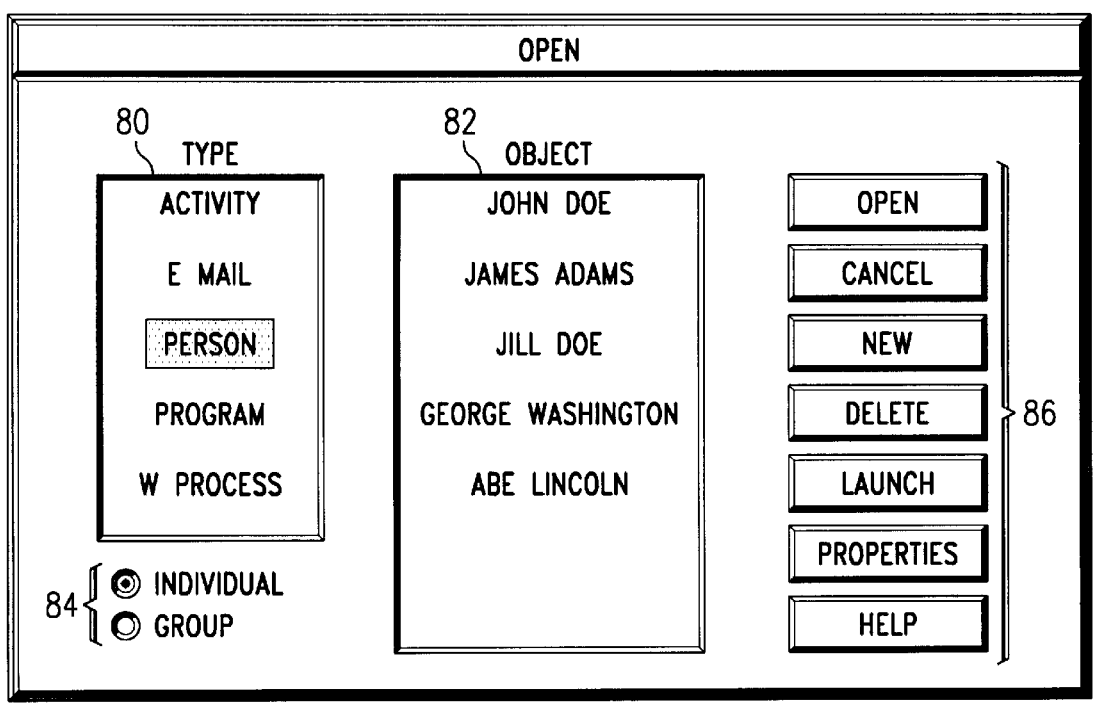
FIG. 3 illustrates a window for the object open feature.

Referring now to FIG. 3, there is illustrated a diagram of a conventional display for selecting or opening an object. When the object window is opened, two regions 80 and 82 are provided, region 80 providing various types of objects and region 82 providing the short titles of the objects. The types of objects illustrated are "activity", "E-Mail", "person", "program" and "word processing". Additionally, individual objects or groups of objects of the type designated in region 80 can be selected with two regions on the display 84, which will be described hereinbelow. Additionally, there are various function keys or buttons 86 that are provided which allow various functions to be applied to a selected object. For example, there is an "Open" function that allows the object to be opened, a "Cancel" function that closes the window illustrated in FIG. 3, a "New" function, which allows a new object of the type selected to be created and a "Delete" function, which allows the selected object to be deleted. Also provided are a "launch" function, which is associated only with programs or file functions which allow the various programs to be started directly from the window, a "Properties" function which allows objects to have their properties displayed, and a "Help" function to allow on-line or context sensitive help.

If the Person object was selected in region 80, it would only be necessary to select one of the objects, which objects are typically depicted by the person's name from region 82. In a Windows™ environment, a mouse or pointing device could be utilized to point to the selected object and then selected by depressing one of the mouse buttons. The "Open" function button could then be selected to open the object or, more typically, a double depression or double "click" of the mouse button on the selected object would be utilized to open the object.

Figure 4A:
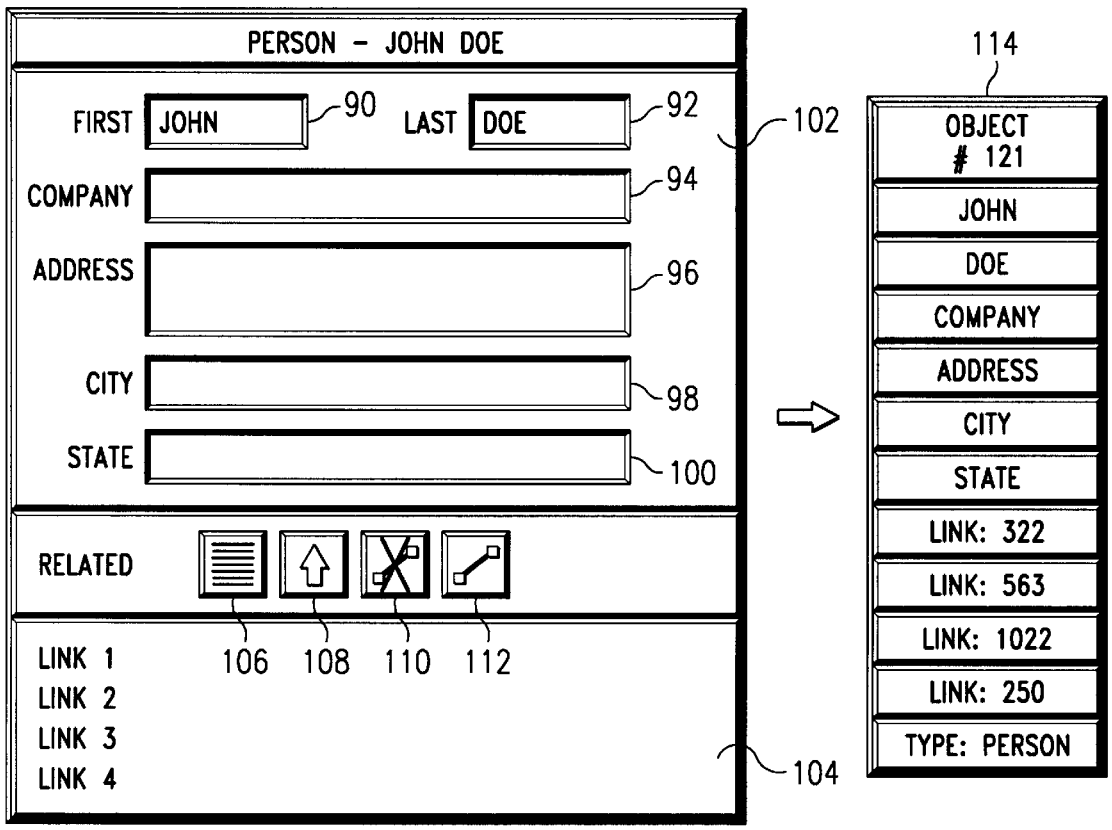
FIGS. 4a and 4b illustrate two different objects and the associated linking.
Figure 4B:
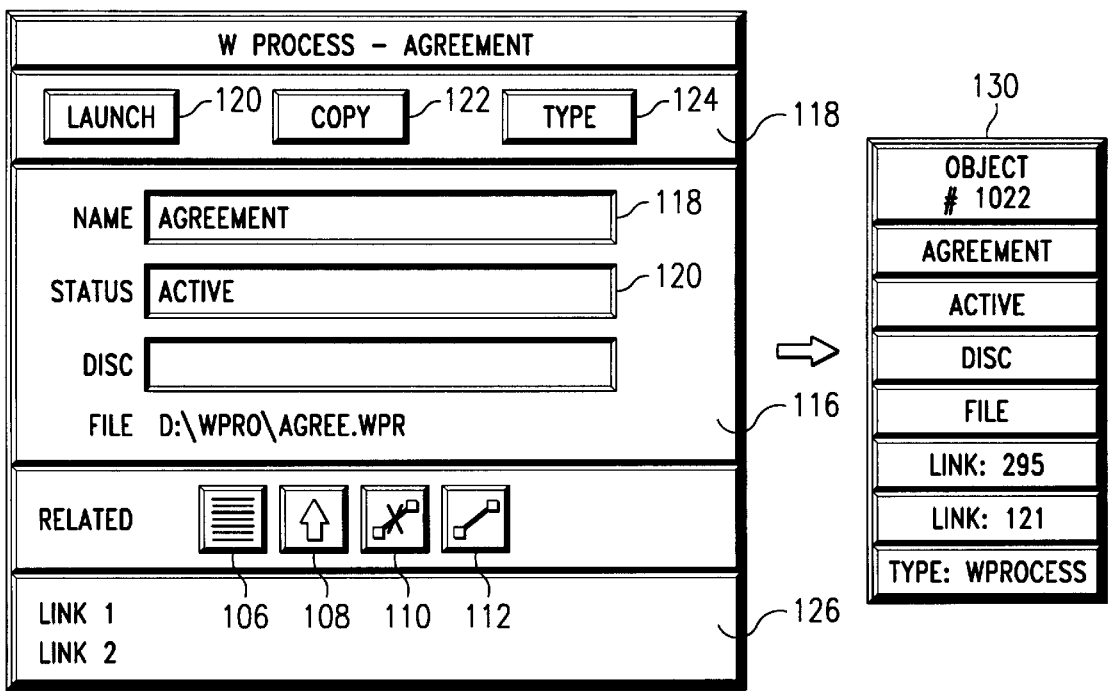

Referring now to FIGS. 4a and 4b, there are illustrated windows for two objects, a Person object in FIG. 4a and a Word Processing object in FIG. 4b. In FIG. 4a, the display displays various user definable fields that allow information to be input or edited within a given object description. In FIG. 4a, there are illustrated a user definable field 90 for entering the first name, a user definable field 92 for inputting the last name, a user definable field 94 for inputting an associated company name, a user definable field 96 for inputting an address, a user definable field 98 for inputting a city and a user definable field 100 for inputting a state. These user definable fields 90–100 can be arranged in any way on the display, this being a function of the programmer. This is conventional when dealing with any type of database.

The display is divided up into a user definable area 102, which contains the user definable fields 90–100 and a link region 104 to display the various links or relationships with the object that is displayed. As illustrated in the region 104, there are four links, LINK1, LINK2, LINK3 and LINK4. Additionally, there are four function buttons 106, 108, 110 and 112 associated with the display portion 104. The function button 106 is a display button which can be associated with a mouse pointer for activation thereof. The button 106 controls how the link is displayed, whether it is displayed as a short title or a more detailed title, the button 108 allows selection of a filter function, described hereinbelow, the button 110 allows a link to be deleted and the button 112 allows a new link to be created.

The object depicted in FIG. 4a, which is a Person object, has associated therewith a parameter table 114. The link table 114 has associated therewith a user object number and then the various fields are disposed within the table. Therefore, whenever the object is selected, it is only necessary to go to the object number, since this is what is stored in the parameter table, and then extract from the Parameter Table the various field information for insertion into the field display and then also display the various links. Further, there is always a type field which defines how the information is to be displayed. In the Parameter Table, the various links are stored merely as the object numbers. Whenever the display of a Person object requires that the link be displayed in region 104, i.e., a description field, the system looks toward the associated link table of the link of the open Person object and it looks to that link's parameters stored in the associated Parameter Table of the link to extract the information and display it with the associated open Person object in the appropriate fields. If the relationship in the regions 104 defined the person link, it would only be necessary to look to the Parameter Table to select the first and last names and display these in the region 104. However, other fields could also be displayed. For example, an expansion of the link definition with the button 106 could require the city and state to be displayed also, which are merely enclosed within the Parameter Table of that associated link.

In FIG. 4b, the Word Processing object is illustrated, which is for example, an agreement. The display provides for a region 116 that displays various user defined fields. A field 119 is provided for the name of the document, a user defined field 120 is provided for defining the status of the document, which can be various statuses such as active, inactive, etc. Other user defined fields are also provided. Control region 118 is provided, which provides for various control buttons that allow certain features to be accessed. A "launch" button 120 allows the word processing program to be started and immediately load the object file. A copy button 122 allows the document to be copied to another area, disk, diskette, etc. and a Type button 124 is also provided, which Type button 124 allows the user to change the type of the object that is available, i.e., selects between two or more different programs that can be launched. A Related portion 126 provides for the links or relationships with a Control portion associated therewith having the buttons 106, 108, 110 and 112 associated therewith. The Word Processing object has associated therewith a Parameter Table 130, similar to the Parameter Table 114. The Parameter Table 130 has embedded therein the link table that defines the relationships in the associated link table. Again, the table 130 has associated with a unique object number and various fields to define the various information in user definable fields and also the links. Again, the links are defined merely as the link numbers in the system.

Figure 5:
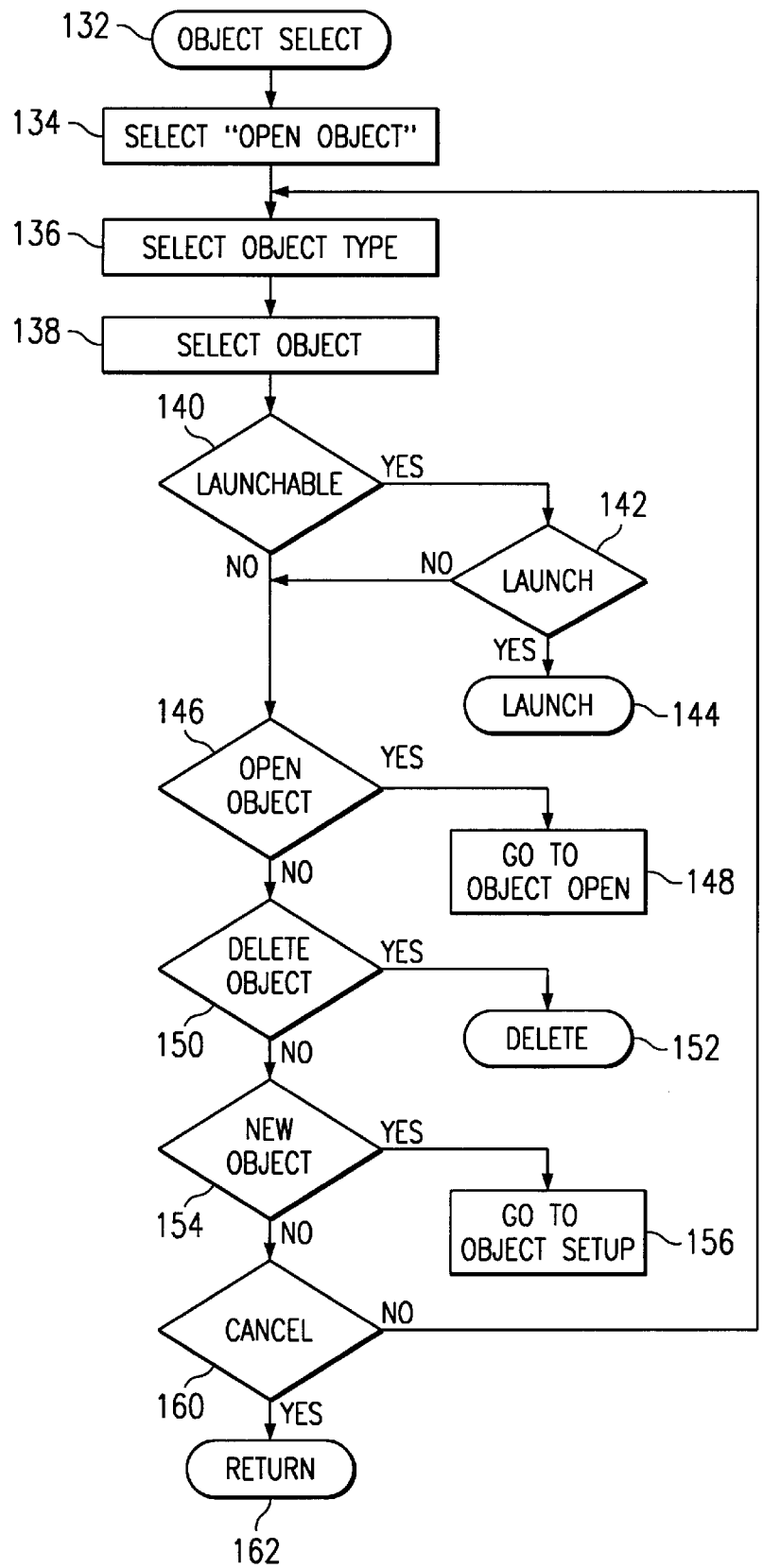
FIG. 5 illustrates a flowchart depicting the operation of selecting an object.

Referring now to FIG. 5, there is illustrated a flowchart depicting the operation wherein an object is selected. The operation is initiated at a block 132 and then proceeds to a function block 134 to select the feature "Open Object" from the display. The program then flows to a function block 136 to select the object type, i.e., a Person object, a Word Processing object or an E-Mail object. The program then flows to a function block 138 to select the object and then to a decision block 140. The decision block 140 determines whether the object contains launchable data. If so, the program would flow to a decision block 142 along a "Y" path to determine if the "launch" control button were depressed. If so, the program would flow along the "Y" path to a launch box 144 to launch the appropriate application. If the launch button had not been depressed, the program would then flow to the input of a decision block 146. If the data were not associated with a launchable application, the display would typically illustrate the launch button in a faint outline or not illustrate it at all and the program would bypass the decision block 140 by flowing along the "N" path thereof to the function block 146. The function block 146 determines whether the Open Object button has been depressed. If so, the program flows along a "Y" path to a block 148 wherein the program flows to a subroutine to open the object. If the object button has not been depressed, the program flows along the "N" path from the decision block 142 to a decision block 150 to determine if the "Delete" button has been depressed. If so, the program flows along a "Y" path to a delete block 152 and, if not, the program flows along an "N" path to a decision block 154. Decision block 154 determines whether the "New" button has been depressed. If so, the program flows along a "Y" path to a block 156 to route the program to the "Object Setup" routine. If the "New" button has not been depressed, the program flows along the "N" path to a decision block 160 to determine if the "Cancel" button has been depressed. If not, the program flows along the "N" path back to the input of the function block 136 to select a new object and continues in this loop until either the program has been cancelled or one of the features has been selected. If the Cancel button has been depressed, the program will flow from the decision block 160 along the "Y" path to a return block 162.

Figure 6:
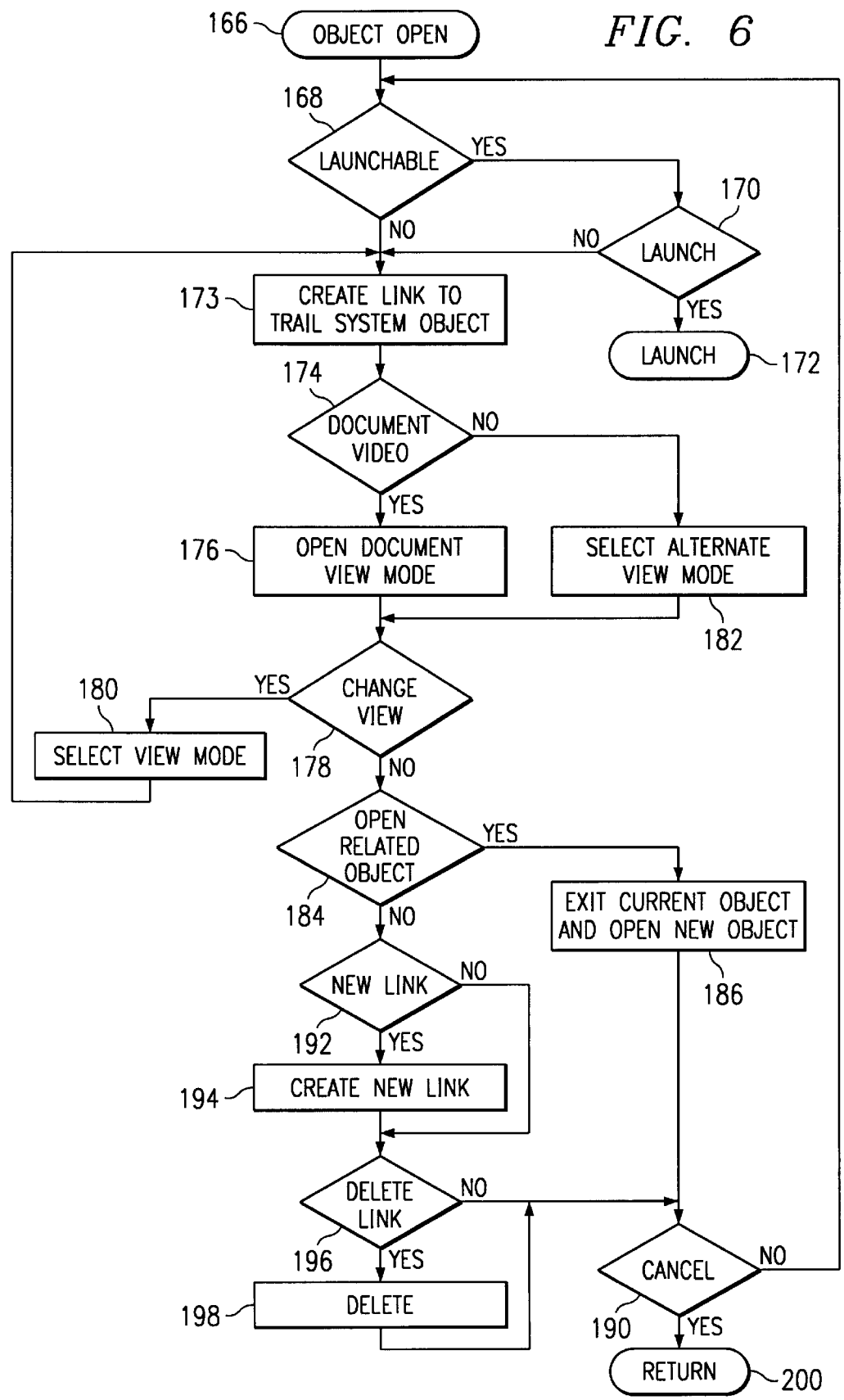
FIG. 6 illustrates a flowchart depicting the operation of opening an object.

Referring now to FIG. 6, there is illustrated a flowchart depicting the operation wherein the object is opened. The program is initiated at a start block 166 and then flows to a decision block 168 to determine if the program is launchable. If so, the program flows along a "Y" path to a decision block 170 to determine if the "Launch" button has been depressed and then to a launch block 172 if the "Launch" button has been depressed. If the "Launch" button has not been depressed, the program flows along the "N" path back to the input of a function block 173 to create a link to a Trail System Object, which System Object will be described hereinbelow, if the program was not launchable, as was the case with a Person object and an E-Mail object, the program would flow from a decision block 168 along the "N" path to the function block 173.

After the Trail System Object has been created, the program flows to a decision block 174 to determine whether the Document View feature is enabled. This is available only when objects such as Word Processing objects, Drawings, Spreadsheets or FAX objects are present. If a document view button is depressed, the program will flow along the "Y" path from decision block 174 to open the Document View mode, as indicated by a function block 176, wherein the document could be viewed, but not edited. The program would then flow to a decision block 178 to determine if the display used can be changed, i.e., by changing to a different mode. If so, the program will flow along the "Y" path to a function block 180 to select the view mode. View modes would be such things as viewing the full page, viewing a portion of the page, zooming into a portion of the page, etc. After selecting the view mode, the program flows back to the input of the function block 173.

If the document view mode is not selected, or not enabled, the program would flow along the "N" path to a function block 182 to select an alternate view mode, and then to the input of decision block 178. If the view is not to be changed, the program would then flow along the "N" path to a decision block 184 to determine if the system required a new link to a related object. If so, the program would flow along a "Y" path to a function block 186 to exit the current object and open a new object. This merely requires the pointing device to be directed toward one of the displayed links in the related object region of the display.

If the system has determined that the user did not want to jump to a related object, the program would flow from the decision block 184 along the "N" path to a decision block 192 in order to determine if a new link is to be created. If so, the program would flow along a "Y" path to a function block 194 to create a new link and then to the input of a decision block 196. If a new link was not to be created, the program would flow from the decision block 192 along the "N" path to the input of decision block 196. The decision block 196 determines whether the selected link is to be deleted. if so, the program flows along the "Y" path to a delete function block 198 and then to the input of a decision block 190. If the link is not to be deleted, the program will flow directly from the decision block 196 along the "N" path to the input of the decision block 190. If the cancel button were depressed, the program would flow from the decision block 190 to a return block 200.

Figure 7:
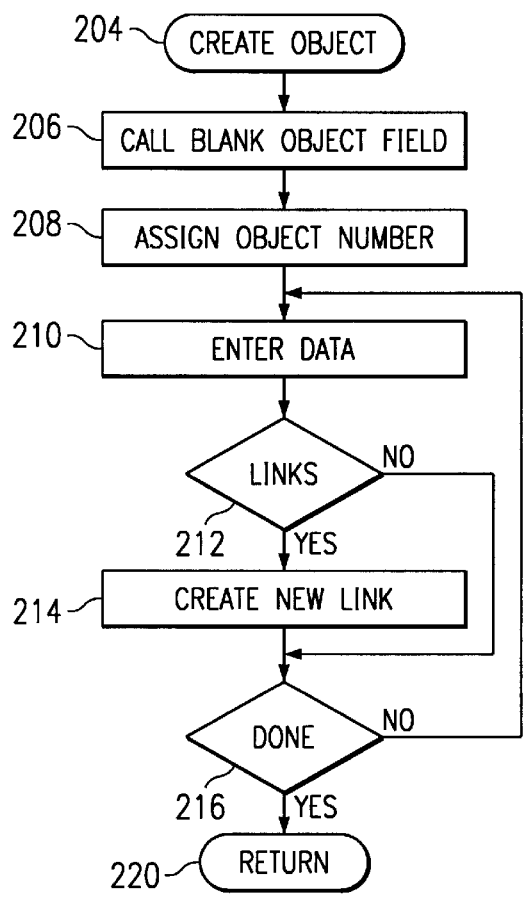
FIG. 7 illustrates a flowchart depicting the steps necessary to create an object.

Referring now to FIG. 7, there is illustrated a flowchart depicting the steps wherein an object is created, which program is initiated at a block 204 and then proceeds to a function block 206 to call a blank object field for the selected type of object. The system would then assign a unique object number to the new object, as indicated by a function block 208. The program would then flow to a function block 210 to enter the data into the user defined fields and then flow to a decision block 212. The decision block 212 determines whether links to other objects are to be created. If so, the program would flow along the "Y" path to a function block 214 to create the new links and then to the input of the decision block 216 to determine if all necessary links and user defined data had been entered. The program would flow along an "N" path back to the input of a function block 210. Additionally, if no links had been created, a program would flow from the decision block 212 along the "N" path around the function block 214 directly to the input of the decision block 216. When all user defined data had been entered and all links had been created, the program would flow from decision block 216 along a "Y" path to a return block 220.

As described above, each object on the system is treated equally. For example, a Word Processing object is treated the same as an E-Mail object or a FAX object. By way of example, if a user were to create a Word Processing Object, i.e., a word processing document, this would be treated the same as if the user sent the E-Mail to another individual. The Word Processing object would have its unique parameters associated therewith and the E-Mail object would have its unique parameters associated therewith. The Word Processing object would have associated therewith parameters defining the title or descriptor, the file location and the type of word processing program that created the word processing file. By comparison, the E-Mail object would have associated therewith the actual text of the E-Mail, the time it was sent or received and the person to whom it was sent or the person from which it was received. Further, it could have some type of title or descriptor associated therewith.

One aspect that distinguishes a Word Processing object from the E-Mail object is the "type" classification that is designated when the object is created.

This type classification allows the system to define the unique way in which an object is handled within the parameters of the system. To the user, each object is treated equally, and can therefore be linked as a mere object on the system. However, once the object is selected, the system parameters define how the user can manipulate that object, i.e., view the contents of an E-Mail, launch a word processing program, view a graphics program, or launch the program that originally created the object.

One aspect that distinguishes a Word Processing object from the E-Mail object is the object "type" that is designated when the object is created. This type classification allows the system to define the unique way in which an object is handled within the parameters of this system. To the user, each object is treated equally and can therefore be linked as a mere object on the system. However, once the object is selected, the system parameters define how the user can manipulate that object, i.e., view the contents of E-Mail, launch a word processing program, view a graphics object or launch the program that originally created the object.

In addition to a User-Created object, there are also System-Created objects.

These are objects that are created as the result of some defined event. The system created objects are to be distinguished from System objects, which will be described hereinbelow. System objects are objects that have already been created but are merely reclassified as a System object. System-Created objects are created by the system as predetermined types of objects, such as Person objects, Word Processing objects, E-Mail objects, etc. One type of System-Created object is an E-Mail object that is received. When the system detects the receipt of an E-Mail, the system creates a parameter list for the received E-Mail and assigns an Object number. In order to build the parameter list, the system receives the text of the E-Mail and stores it in the associated field in the parameter list, receives an indication of who the E-Mail was received from and the time that it was received. Further, there could be a descriptor transmitted with the E-Mail that would allow the system to also place this in the appropriate field of the parameter list. By detecting that an E-Mail was received, the system can automatically determine the type of object that is to be created and then determine what information is to be placed in what field, since the "type" designator defines what parameter list is to be built when creating an object. Thereafter, a user merely needs to look at all of the E-Mail objects in order to determine that there is a new B-Mail object in the system.

Another type of System-Created object is a FAX object. To create this object, the system merely is to detect that a FAX is being received external to the system. The system can then store the image file in association with the parameter list of the FAX object, assign a unique object number to the FAX object, determine at what time the FAX was received and from whom the FAX was received, since this is information that is typically sent with the FAX. Additionally, the system could determine the number from which the FAX was sent. This all can be stored in the parameter list associated with the new faxed object. Again, it is the detection of the receipt of the FAX that determines what type of object it is. Thereafter, the user merely needs to get a list of all FAX objects to determine that the Fax object exists.

At the basic level of a System-Created object, no links are associated with a System-Created object; that is, the system does not initially create relationships between the newly System-Created object and other objects in the system. However, at a higher level, the system could create relationships. To do this, it is necessary for the information that is received by the system to have associated therewith some type of linking information. One example of this would be some indicators sent as to the person that sent the FAX. If the person sending the FAX or E-Mail had an associated Person object on the system, this relationship would be created. Further, if a FAX or E-Mail were sent to the system and it was associated with some type of program object defining the program project that the FAX or E-Mail was provided to, this information could be extracted from the received E-Mail or FAX and a relationship created.

Figure 7A:
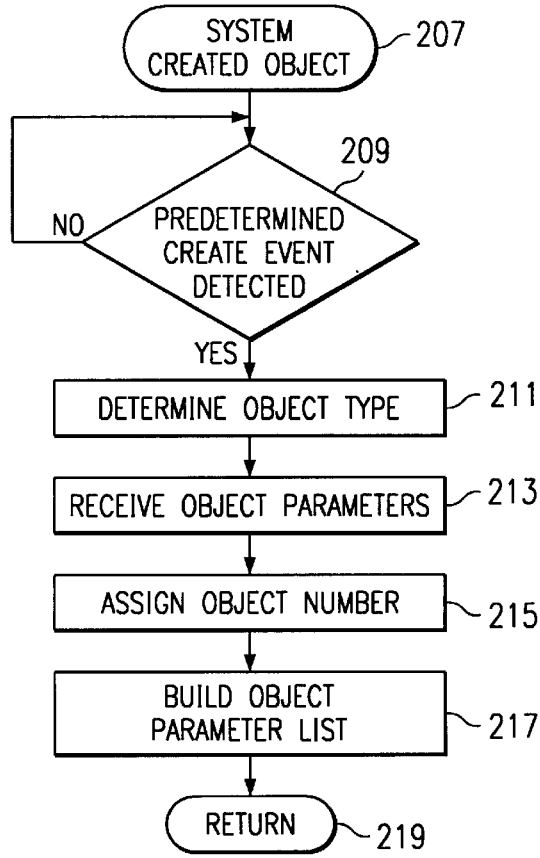
FIG. 7a illustrates a flowchart for defining a System-Created object.

Referring now to FIG. 7a, there is illustrated a flowchart depicting the operation wherein a System-Created object is defined, which program is initiated at a block 207. The program then flows to a decision block 209 to determine if a predetermined Create Event has been detected. If not, the program flows along an "N" path back to the input of decision block 209. When the event has been detected, the program flows along a "Y" path to a function block 211 to determine the object type associated with the Create Event. As described above, this could be the receipt of an E-Mail or a FAX. The program then flows to a function block 213 to receive the object parameters, which in the case of an E-Mail, would be the time at which it was received and the actual text of the E-Mail. The program would then flow to a function block 215 to assign an object number to the new object and then to a function block 217 to build the object parameter list. Once the system knows the type of object, it can then determine the layout of the table, which defines the layout of the display, and then insert the parameters in the appropriate fields. The program then flows to return block 219.

Figure 8:
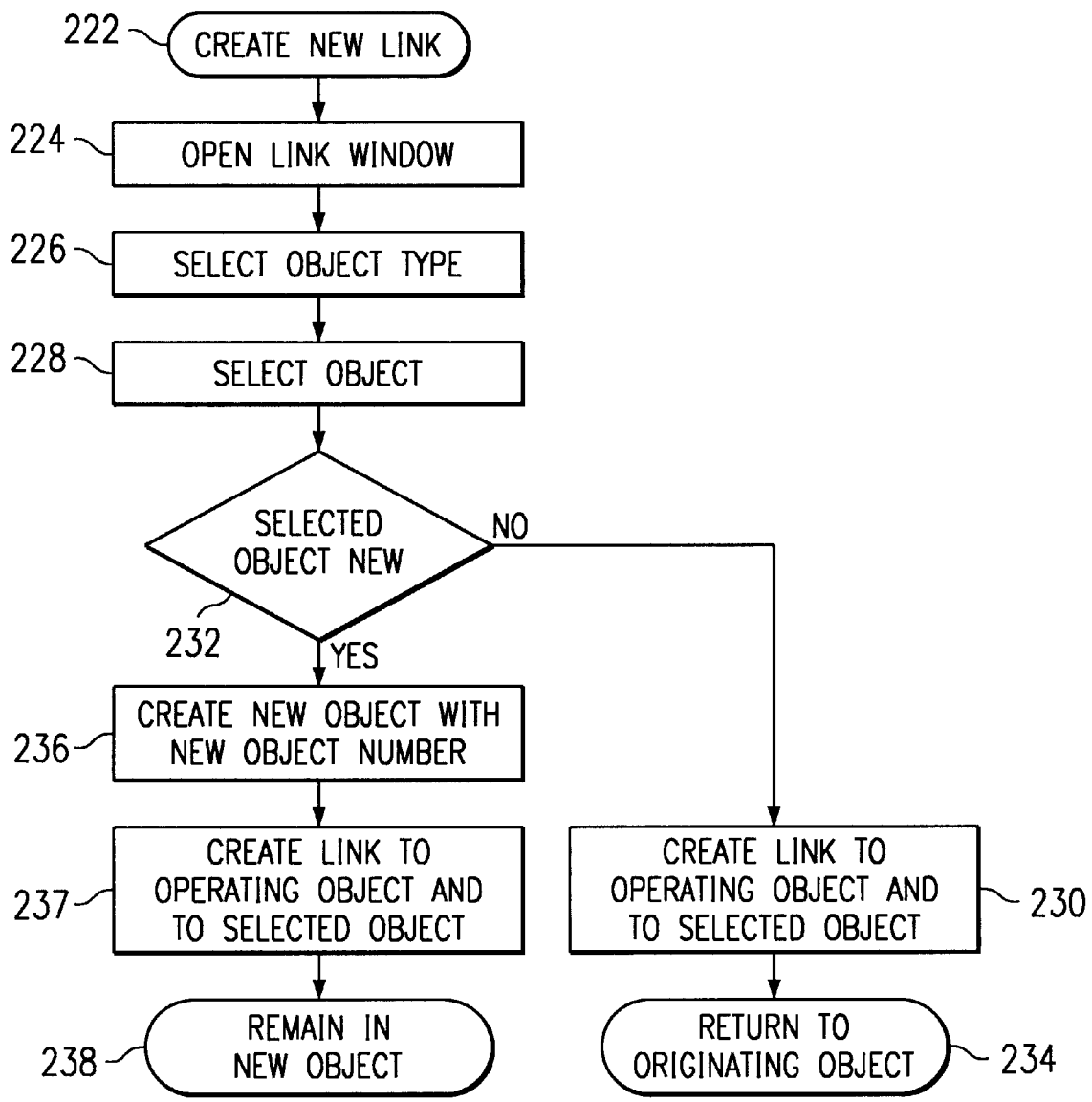
FIG. 8 illustrates a flowchart depicting the steps necessary to create a new link to a given object.

Referring now to FIG. 8, there is illustrated a flowchart depicting the program steps necessary to create a new link, which is initiated at a block 222, and then proceeds to a function block 224, wherein the window 40 "open" link feature is displayed. The program then flows to a function block 226 to select the object type and this brings up the associated objects for the selected object type. The user then selects the object from the displayed objects, as indicated by function block 228, and then proceeds to a decision block 232 in order to determine if the selected object is a new object or if it is an old object. If it is an old object, the program flows along an "N" path to a function block 230 to create the link to the originating object and also to the selected object. In this operation, the object table associated with the object that is presently open is updated with the object number of the linked-to-object and the linked-to-object also has its object table updated with the object number of the presently opened object. This creates a bidirectional link. The program then flows to a block 234 to return to the originating object. If the selected object is not new, the program will flow along the "Y" path from decision block 232 to a function block 236 to create a new object with a new object number. After the new object is created, the system will create a link to the Operating object, as indicated by function block 237, similar to function block 230, and remain in the new object, as indicated by a block 238.

Figure 9:
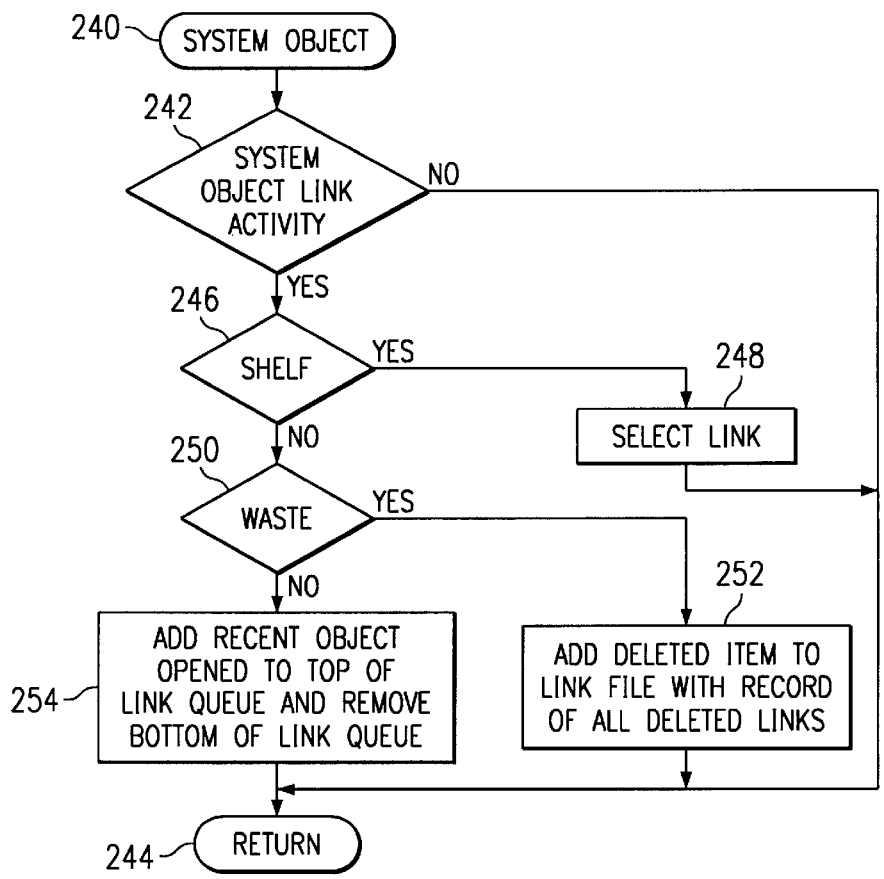
FIG. 9 illustrates a flowchart depicting the definition of a System object.

Referring now to FIG. 9, there is illustrated a flowchart depicting the operation wherein a System object is updated. A System object is an object that has predefined parameters that are not user definable or editable by the user. However, a System object can have various links associated therewith. There are three types of System objects, a Shelf object, a Waste object and a Trail object. The program for dealing with the System object is initiated at a block 240, then proceeds to a decision block 242. Decision block 242 determines whether there is any System object link activity. If not, the program flows along the "N" path to a Return block 244. However, if there is System object link activity, the program will flow along a "Y" path to the input of one of three decision blocks associated with the Shelf System object, Waste System object or Trail System object. Each of the objects is automatically updated as the result of various activity on the system.

The program first flows a decision block 246 to determine if the activity is associated with the Shelf object. If so, the program will flow along a "Y" path to a function block 248 to select a link. This is the activity that determines whether the Shelf System object has activity associated therewith. This is an operation wherein the user will select the "create" link function in a System object window, which allows link to be created in the manner described hereinabove. Once a link has been created and the System object table updated, the program will flow to the return block 244. If the activity is not that of the Shelf System object, the program will flow from the decision block 246 to a decision block 250 to determine if the activity is associated with the Waste System object. This activity is the deletion of any object. Whenever any object is deleted, the information is not removed from the system immediately but, rather, linked to the Waste System object. All links, etc., associated with the deleted object remain. When deletion of an object is determined, the program will flow from the decision block 250 along the "Y" path to a function block 252 to add the deleted item to the Waste System object with a record of all deleted links associated with that deleted object. The program then flows to the return block 244.

If the Trail System object activity was not associated with the Waste System object 250, then it must be associated with the only other System object, the Trail object. The Trail object is an object wherein any activity on the system, i.e., opening an object or linking to an object, is stored in the object table for the System object as a link. Therefore, the program will flow along the "N" path from the decision block 250 to a function block 254 to add the recent open object to the top of the link queue, if the queue contains more than 100 objects, and remove the object at the bottom of the link queue. Of course, the queue could be maintained much longer and essentially never remove deleted objects unless the user so desires.

Figure 10:
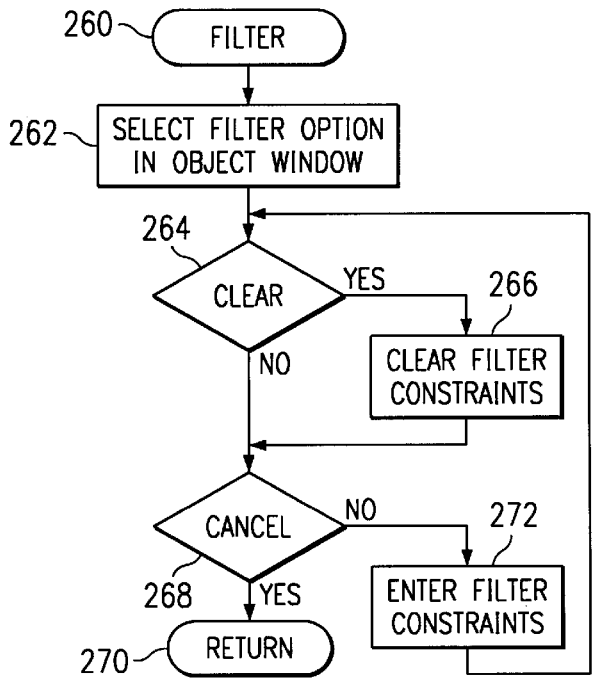
FIG. 10 illustrates a flowchart depicting the filter operation.

Referring now to FIG. 10, there is illustrated a flowchart depicting the filter operation. In the filter operation, a user can determine what relationships or links are displayed in the object window. This is done by defining certain restrictive information by which to sort the various links. For example, if a user determined that only Person objects having a first name that started with "P" would be selected, the various Person objects that were in the relationship or link file would be examined and only those having in the field associated with the first name of that object a first name beginning with a "P" would be displayed. This essentially reduces the amount of information displayed in the object window. A filter operation is depicted by a flowchart in FIG. 10, which is initiated at a block 260 and then proceeds to a function block 262 to select the filter option in the object window, which is essentially the button 108. The program then flows to a decision block 264 to determine if the "Clear" function has been selected, which clears all the filter constraints. If so, the program will flow along the "Y" path to a function block 266 to clear all the filter constraints, i.e., select all relationships or links, and then to the input of a decision block 268. If the information was not to be cleared, the program would flow directly from the decision block 264 along the "N" path to the input of decision block 268. Decision block 268 determines whether the function has been cancelled, which would cause the program to flow along a "Y" path to a return block 270. If the cancel feature were not selected, the program would flow along an "N" path to a function block 272 to enter the filter constraints, and then back to the input of decision block 264.

In summary, there has been provided an object-oriented architecture that utilizes bidirectional links between a variety of objects within the system. Objects are first defined with an object table, wherein each of the objects is grouped as a type of object and also associates therewith various user definable parameters. In addition, each of the objects is provided a unique object number in the system, and various links to other objects are associated therewith. Each of the links in the system is stored in a link table associated with the object, which are selectable links. By selecting the links, the user can select or move to another object in the system. The other object in the system will also have in its associated link table linking information back to the other object from which it was linked to in addition to links to other objects in the system. However, each object will only have links that are a single link deep.

Although the preferred embodiment has been described in detail, it should be understood that various changes, substitutions and alterations can be made therein without departing from the spirit and scope of the invention as defined by the appended claims.

What is claimed is:

1. A method for linking objects in an object-oriented system, comprising the steps of:
    defining a plurality of objects in the system by the steps of:
        partitioning the system into a plurality of portions, each portion comprising an object and each object associated with a defined functionality in the system,
        associating a unique object identification number with each of the objects, and
        defining parameters of each object and the associated portion and storing the defined parameters in a table associated with the unique ID number of the object, and associating each table with the associated object;
    creating relationships between any of the objects in the system and storing the created relationships in the associated table of all of the objects having the relationship;
    accessing one of the objects and the associated table;
    viewing the relationships in the associated table to other objects; and accessing via the relationships any of the objects contained within the table and having the relationship which is defined in the associated table of the accessed one of the objects.

2. The method of claim 1, and further comprising the step of creating a System object having relationships associated therewith that are defined by a predetermined event occurring within the system.

3. The method of claim 2, wherein the predetermined event comprises the access of an object through the step of accessing the other relationships.

* * * * *